J. G. GERVAIS.
COUNTERBORING TOOL.
APPLICATION FILED JAN. 5, 1914.
1,097,620.
Patented May 26, 1914.
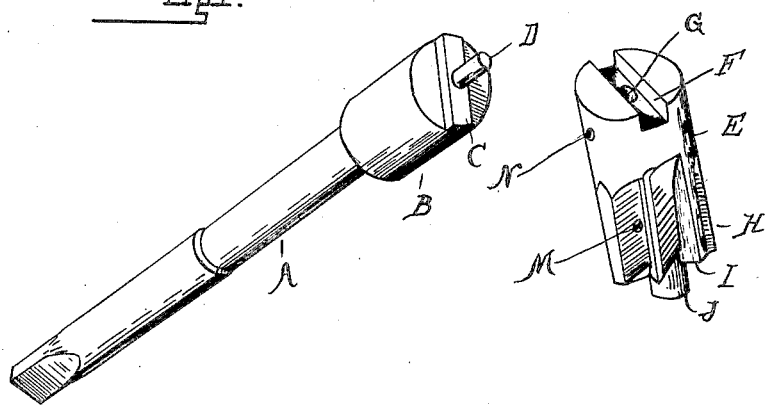
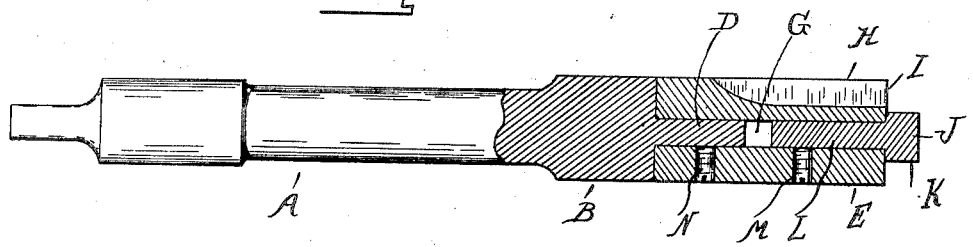
Witnesses
Inventor
Joseph G. Gervais

UNITED STATES PATENT OFFICE.

JOSEPH G. GERVAIS, OF DETROIT, MICHIGAN, ASSIGNOR TO NATIONAL TWIST DRILL & TOOL COMPANY, OF DETROIT, MICHIGAN, A CORPORATION OF MICHIGAN.

COUNTERBORING-TOOL.

1,097,620.  Specification of Letters Patent.  Patented May 26, 1914.

Application filed January 5, 1914.  Serial No. 810,488.

*To all whom it may concern:*

Be it known that I, JOSEPH G. GERVAIS, a citizen of the United States of America, residing at Detroit, in the county of Wayne and State of Michigan, have invented certain new and useful Improvements in Counterboring-Tools, of which the following is a specification, reference being had therein to the accompanying drawings.

The invention relates to tools designed for counter-boring and of that type in which the cutter is centered by a pilot fitting the original bore.

It is the object of the invention to obtain a construction in which exchangeable cutters may be used with a common shank, and further to obtain a strong coupling connection between the shank and the tool, permitting of quickly attaching and detaching cutters.

In the drawings: Figure 1 is a perspective view of the shank and cutter detached; and Fig. 2 is a longitudinal section showing these parts attached.

A is the shank member which may be of any suitable construction for fitting a drill chuck or other operating device. At the end of this shank is a head B milled or otherwise fashioned to form a cross tenon C at the outer end thereof and having the pintle D projecting concentric with the axis of the shank.

E is the tool which is formed with a mortise F extending across the inner end thereof, and a bore G corresponding in diameter to the pintle D. The outer end of this tool is fashioned to form a reamer H, having end milling cutters I.

J is an exchangeable pilot member having its head K corresponding in diameter to the original bore which is to be enlarged by counter-boring. The member J is also provided with a shank L fitting the bore G in the cutter and secured in position by a set screw M extending in through the side of the cutter. A second set screw N secures the cutter to the pintle D.

With the construction as described in use, any one of a series of cutters E may be engaged with the shank A by slipping on to the pintel D and inserting the tenon C into the mortise F. The set screw N is then tightened and will hold the parts from disengagement. The pilot J may be selected with reference to the size of the original bore, and independent of the selection of a particular cutter used for a counter-bore. All that is necessary in exchanging cutters is to loosen the set screw N, while the pilots may be exchanged with equal facility.

What I claim as my invention is,—

1. The combination with a rotatable shank member, of an exchangeable cutter member mountable thereon, with a transversely-extending mortise and tenon engagement, and a pin on one of said members engaging a recess in the other to hold the same in axial alinement.

2. The combination of a rotatable shank member provided with a transversely-extending tenon at its end and a pin projecting from said tenon axially of said shank, and a removable cutter member having a transversely extending mortise for engaging said tenon and a central recess for engaging said pin.

3. The combination of a rotatable shank member having a transversely-extending tenon at the end thereof and a pin projecting from said tenon axially of said shank, a cutter member having an axial bore fitting said pin and a transversely-extending mortise for engaging said tenon, and a set screw for clamping said cutter member to said pin.

4. The combination of a rotatable shank member having a head, with a transversely-extending tenon at its end and a pin projecting centrally from said tenon, a cutter member centrally bored to fit said pin and transversely mortised to engage said tenon, a pilot member having a shank engaging the opposite end of said bore and a head fitting the initial bore which is to be counter-bored.

5. The combination of a rotatable shank member having an enlarged head with a transversely-extending tenon at the end thereof and a pintle projecting centrally therefrom, a cutter member axially bored to fit said pintle and transversely mortised to fit said tenon, a pilot having a shank for fitting said bore and an enlarged head, and set screws for clamping the shank to said pilot and said pintle to hold the parts from displacement.

6. The combination of a rotatable shank member having an enlarged head, of a transversely-extending tenon at the end thereof and a central pintle projecting therefrom, a removable cutter member centrally bored to fit said pintle and transversely mortised to engage said tenon, a removable pilot having a shank for engaging the central bore of said cutter, and means for securing said cutter and said pilot in position.

In testimony whereof I affix my signature in presence of two witnesses.

JOSEPH G. GERVAIS.

Witnesses:
 HOWARD L. MCGREGOR,
 HIRAM W. BROADWELL.